United States Patent
Sazawa et al.

(10) Patent No.: US 9,705,956 B2
(45) Date of Patent: Jul. 11, 2017

(54) IMAGE TRANSMITTING METHOD, PROGRAM AND APPARATUS

(71) Applicant: FUJITSU LIMITED, Kawasaki-shi, Kanagawa (JP)

(72) Inventors: Shinichi Sazawa, Atsugi (JP); Yuichi Sato, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 478 days.

(21) Appl. No.: 14/468,423

(22) Filed: Aug. 26, 2014

(65) Prior Publication Data
US 2015/0026299 A1    Jan. 22, 2015

Related U.S. Application Data

(63) Continuation of application No. PCT/JP2012/055319, filed on Mar. 2, 2012.

(51) Int. Cl.
*G06F 15/173* (2006.01)
*H04L 29/06* (2006.01)
*H04L 29/08* (2006.01)

(52) U.S. Cl.
CPC .............. *H04L 65/80* (2013.01); *H04L 65/60* (2013.01); *H04L 67/08* (2013.01); *H04L 67/325* (2013.01); *H04L 67/42* (2013.01)

(58) Field of Classification Search
None
See application file for complete search history.

(56) References Cited

U.S. PATENT DOCUMENTS

2006/0203855 A1    9/2006 Senta et al.
2006/0206820 A1    9/2006 Bullard et al.
(Continued)

FOREIGN PATENT DOCUMENTS

EP    2237526 A1    10/2010
JP    2006-254383    9/2006
(Continued)

OTHER PUBLICATIONS

Chinese Office Action dated Mar. 4, 2016 in corresponding Chinese Patent Application No. 201280071083.2.
(Continued)

*Primary Examiner* — Scott B Christensen
(74) *Attorney, Agent, or Firm* — Staas & Halsey LLP

(57) ABSTRACT

An image transmitting method is used to transmit image data from an image transmitting apparatus to an image receiving apparatus. The image transmitting device receives operation events generated in the image receiving device through a network. The image transmitting apparatus calculates a determination time of the image data, in a transmission control based on a previously determined transmission interval, based on an amount of the image data to be transmitted to the image receiving apparatus, information regarding the network through which the image data is transmitted, and a number of the operation events that have been received from an immediately previous transmission time until a time of transmitting the image data. The image transmitting apparatus compares the determination time with a transmission time indicating a time of transmitting the image data, and prevents a transmission of the image data when the determination time is later than the transmission time.

4 Claims, 11 Drawing Sheets

(56) References Cited

U.S. PATENT DOCUMENTS

| | | | |
|---|---|---|---|
| 2007/0260850 A1 | 11/2007 | Kameyama et al. | |
| 2008/0077660 A1 | 3/2008 | Tomida | |
| 2009/0046744 A1 | 2/2009 | Hamanaka et al. | |

FOREIGN PATENT DOCUMENTS

| | | |
|---|---|---|
| JP | 2007-251737 | 9/2007 |
| JP | 2007-265207 | 10/2007 |
| JP | 2008-289030 | 11/2008 |
| JP | 2009-49506 | 3/2009 |
| JP | 2009-54096 | 3/2009 |
| JP | 2011-53960 | 3/2011 |

OTHER PUBLICATIONS

Japanese Office Action mailed on Apr. 14, 2015 in Application No. 2014-501921.
Extended European Search Report dated Feb. 19, 2015 in corresponding European Patent Application No. 12870009.3.
Patent Abstracts of Japan, Publication No. 2006-254383, published Sep. 21, 2006.
Patent Abstracts of Japan, Publication No. 2007-251737, published Sep. 27, 2007.
Patent Abstracts of Japan, Publication No. 2007-265207, published Oct. 11, 2007.
Patent Abstracts of Japan, Publication No. 2008-289030, published Nov. 27, 2008.
Patent Abstracts of Japan, Publication No. 2009-049506, published Mar. 5, 2009.
Patent Abstracts of Japan, Publication No. 2009-054096, published Mar. 12, 2009.
Patent Abstracts of Japan, Publication No. 2011-053960, published Mar. 17, 2011.
International Search Report mailed May 22, 2012, in corresponding International Patent Application No. PCT/JP2012/055319.

IMAGE TRANSMITTING METHOD, PROGRAM AND APPARATUS

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/055319, filed on Mar. 2, 2012, the entire contents of which are incorporated herein by reference.

FIELD

The embodiments discussed herein are directed to an image transmitting method, program and apparatus.

BACKGROUND

In recent years, a system architecture so called thin client system has become widespread, which performs most processes including applications on a server apparatus side and transmits a desktop screen image and a result of execution to a client apparatus side so that only required minimum processes can be performed on the client side used by a user.

In the thin client system, a result of processing by the server apparatus and image data such as a desktop screen image stored in a frame buffer are transmitted to the client apparatus through a network in real time. By transmitting image data in real time, the client apparatus is capable of displaying the image data (data in a frame buffer) created by the server apparatus immediately.

In the thin client system, although the server apparatus serves as an image transmitting apparatus for transmitting image data and the client apparatus serves as an image receiving apparatus for receiving the image data, there may be a delay generated in data communication with the client apparatus depending on a condition of the network through which the transmission is performed.

Thus, there is suggested a transmitting method which reduces an influence of a communication delay between a server and a client. As one of conventional methods, there is known a method which enables avoiding a transmission delay by transmitting a sending packet from a transmitting apparatus for transmitting image data to a receiving apparatus for receiving the image data and receiving by the transmitting apparatus a reply of a reception response including a transmission time of the sending packet from the receiving apparatus, and increasing and decreasing a number of packets, when transmitting image data, according to a relationship between a predetermined threshold value and a response time calculated from the transmission time of the sending packet.

Moreover, as another conventional method, there is known a method which enables transmitting image data without waiting a response by transmitting image data of a transmitting target by a transmitting side apparatus to a receiving side apparatus via a network after redundant-encoding the image data according to an encoding rate, which is set based on a packet loss rate expected on the network, and decoding the original image data in the receiving side apparatus using the received encoded data, which has been redundant-encoded.

In the thin client system, it is necessary to quickly detect image data stored in a frame buffer on the server apparatus side and cause the client apparatus to receive the detected image data while preventing the image data from being affected as much as possible.

However, the image data created by the server apparatus relates to a user operation generated in the client apparatus. Thus, a relationship between the user operation generated in the client apparatus and the image data displayed in the client apparatus may be unnatural depending on a timing of transmitting by the server apparatus the image data, which indicates a result of execution in response to the user operation.

When transmitting image data from a server apparatus to a client apparatus, there may be used a method of transmitting with a fixed frame rate and a method of transmitting after waiting for a response from a receiving side. However, a transmission delay is generated even when these transmitting methods are used.

FIG. 10 is an illustration for explaining the method of transmitting with a fixed frame rate.

The left part of FIG. 10 illustrates a server apparatus side of a thin client system, and the right part illustrates a client apparatus side.

When a mouse operation event occurs by a user, the client apparatus transmits each of mouse operations op1, op2, op3, op4, . . . to the server apparatus in an order of occurrence. The server apparatus transmits frames fr1, fr2, fr3, fr4, . . . , which are whole of a part of frame data of a desktop screen image to the client apparatus at a fixed transmission interval. The desktop screen image is updated according to an execution result of an application based on a user operation.

If the transmission interval of the server apparatus is long (if a frame rate is low), there is a problem in that a smooth screen updating cannot be performed because a reception interval becomes long in the client apparatus. For example, in the client apparatus, when the mouse operations op1 and op2 are performed by a user, a desktop screen (frame fr1) which does not correspond to the mouse operation op2 is displayed, or the frames fr2, fr3 and fr4 are displayed at a time when a considerable time has passed after the mouse operations op3 and op4 were done. Thus, there may be a case where a user has an uncomfortable feel that the desktop screen is being updated despite that the user has ended the operation.

If the transmission interval is short (if a frame rate is high), it is possible that a transmission is performed by exceeding a transmittable band of a network through which the server apparatus performs a transmission, and, thereby, reception of the image data (frame fr) is delayed in the client apparatus side, which may result in a delay in updating the desktop screen.

FIG. 11 is an illustration for explaining a delay in a case of the method of transmitting after waiting for a response from the receiving side.

The left part of FIG. 11 illustrates the server apparatus side of the thin client system, and the right part illustrates the client side apparatus. Similar to the case illustrated in FIG. 10, the client apparatus transmits a mouse operation op to the server apparatus in an order of occurrence, and the server apparatus transmits the image data (frame fr) of the desktop screen to the client apparatus after checking a reception response from the client apparatus.

If, for example, an RTT (Round Trip Time) delay is large in a network, the reception response is also delayed in the server apparatus, and, thus, there may be a case where a transmission of a frame fr is skipped depending on a timing of the reception response. For example, if the reception response of the frame fr1 from the client apparatus is delayed, the server apparatus transmits data stored in a frame buffer at a time of reception of the reception response, and, thus, the frame fr2 is skipped depending on a timing and the screen is updated in an order of the frames fr1 and fr3 in the client apparatus, which may prevent a smooth screen updating.

If the image data transmitted by the server apparatus is a desktop screen image or a screen image representing an execution result of an application, the server apparatus is required to transmit image data corresponding to an operation event as early as possible because the screen is updated according to the operation events, which occur in the client apparatus. However, in a case where a plurality of operation events occurs in a short time on the client apparatus side, if the screen to be updated is transmitted to the client apparatus, the transmission time becomes long depending on a network condition, which results in a generation of a transmission delay.

Here, in the condition in which a plurality of operation events occur in a short time, it is possible to regard that a user is performing a series of operations. The screen indicating a final processing result is more important for a user than a screen indicating a processing result in the middle of a series of user operations. Moreover, a user does not have an uncomfortable feel in display updating when a long time is spent on screen updating including the middle of a series of user operations rather than when a final screen is displayed even if the display updating in the middle of a series of user operations is omitted. Further, it is hard to have a feel that a response is delayed if a time until a time of display updating for a final screen is not long.

SUMMARY

There is provided according to an aspect of the present invention an image transmitting method of transmitting image data from an image transmitting apparatus to an image receiving apparatus, including: receiving by the image transmitting device operation events generated in the image receiving device through a network; calculating a determination time of the image data, in a transmission control based on a previously determined transmission interval, based on an amount of the image data to be transmitted to the image receiving apparatus, information regarding the network through which the image data is transmitted, and a number of the operation events that have been received from an immediately previous transmission time until a time of transmitting the image data; comparing the determination time with a transmission time indicating a time of transmitting said image data; and preventing a transmission of the image data when the determination time is later than the transmission time.

The object and advantages of the embodiments will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

A description will be given below of an embodiment of an image transmitting method and an image transmitting apparatus that is disclosed as an aspect of the present invention.

Figure 1:
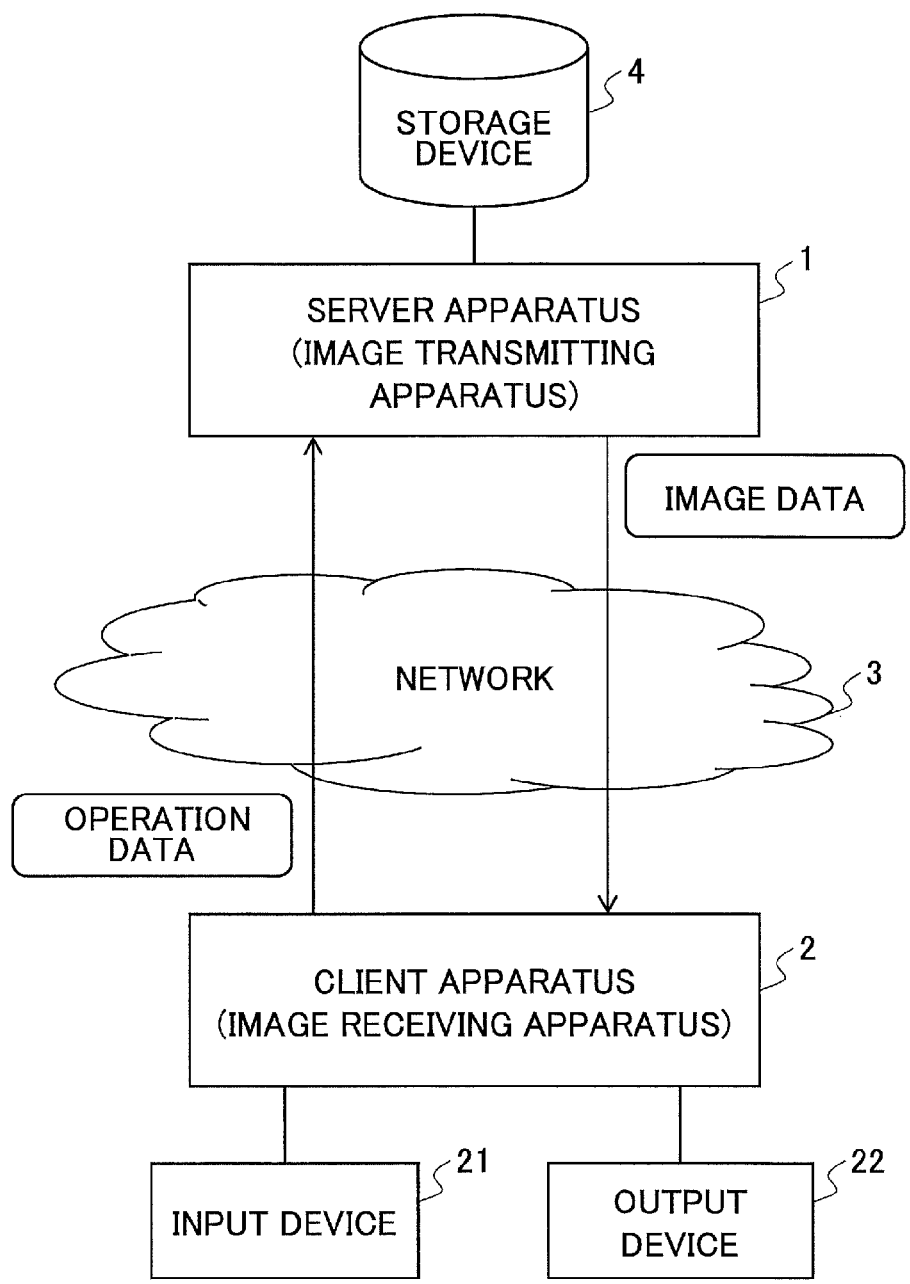
FIG. 1 is a diagram illustrating an image transmitting method, an image transmitting apparatus and an image transmitting system executing an image transmitting program that are disclosed as an aspect of the present invention.

FIG. 1 is a diagram illustrating an image transmitting method, an image transmitting apparatus and an image transmitting system executing an image transmitting program.

The system illustrated in FIG. 1 is an embodiment as a thin client system, and includes a server apparatus 1 and the client apparatus 2 that are connected by a network 3. The server apparatus 1 is connected with a storage apparatus 4 storing application programs usable by a user. The client apparatus 2 includes an input device and a display device 22. The input device 21 is materialized by a mouse, a keyboard, a track pad, a tablet, etc.

The sever apparatus 1 is an apparatus corresponding to the image transmitting apparatus, provides an application to a user of the client apparatus 2, performs all of processes including execution of an application, and creates a desktop environment of the client apparatus 2. That is, the server apparatus 1 transmits image data indicating a desktop screen of the client apparatus 2 to the client apparatus via the network 3.

The client apparatus 2 is an apparatus corresponding to an image receiving apparatus, and functions as a remote operation terminal of an application performed by the server apparatus 1. The client apparatus 2 receives image data from the server apparatus 1 and display it on the display device 22, causes an operation event to occur from a user operation through the input device 21 based on a desktop screen, and transmits operation data indicating the occurred operation event to the server apparatus 1 via the network 3.

Figure 2:
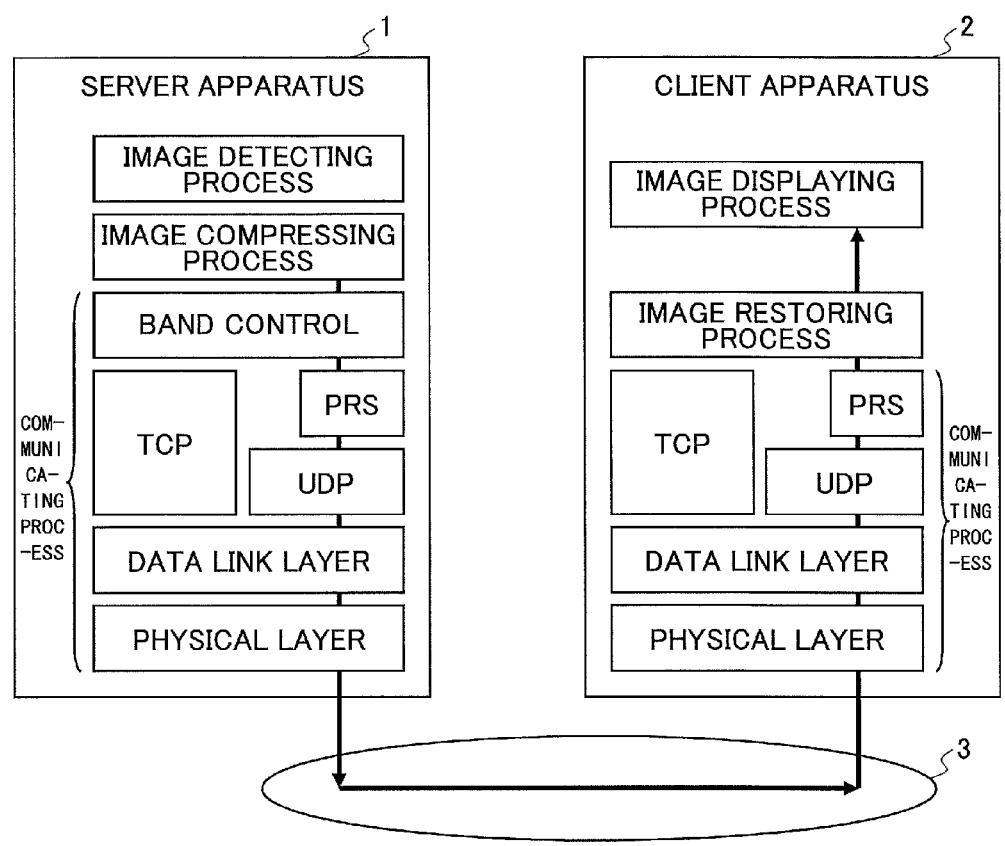
FIG. 2 is a diagram illustrating a transmitting process performed in a server apparatus and a client apparatus.

FIG. 2 is a diagram illustrating a transmitting process performed in the server apparatus 1 and the client apparatus 2.

The server apparatus 1 detects a desktop screen indicating a result of execution of an application program from a frame buffer (an image detecting process), and creates image data for transmission by compressing whole or a part of the detected desktop screen (frame data) (image compressing process). The server apparatus 1 transmits the created image data to the client apparatus 2 at a previously set transmission interval (⅓₀ second) while performing a band control (communicating process).

In the present embodiment, the server apparatus 1 performs the communicating process by using an RPS (Random Parity Stream) communication. The RPS communication is a communicating process according to a UDP (User Datagram Protocol) as a base, wherein a packet loss rate is estimated on a transmitting side, and a transmission packet, which is obtained by redundant-encoding the image data to be transmitted based on the loss rate, is created and transmitted. Then, the original image data is obtained by decoding the transmission packet using the redundancy on the receiving side.

The client apparatus 2 restores the desktop screen (frame data) from the image data received via the network 3 (image restoring process), and displays the restored desktop screen on the display device 22 (image displaying process).

Details of the PRS communication are disclosed in Japanese Laid-Open Patent Application No. 2007-251737, and a description of the PRS communication is omitted.

Moreover, in the present embodiment, the client apparatus 2 performs a transmission of operation data indicating an occurred operation event by using TCP/IP communication. The client apparatus 2 transmits operation data, which indicates contents of the operation event (for example, an amount of travel of a mouse, data input from a keyboard, etc.), to the server apparatus via the network 3 each time an operation event occurs by a user operation applied to the input device 21 with respect to the desktop screen displayed on the display device 22. The server apparatus 1 causes an operation event to occur from the received operation data, and transfers the operation event to the application and saves it.

Figure 3:
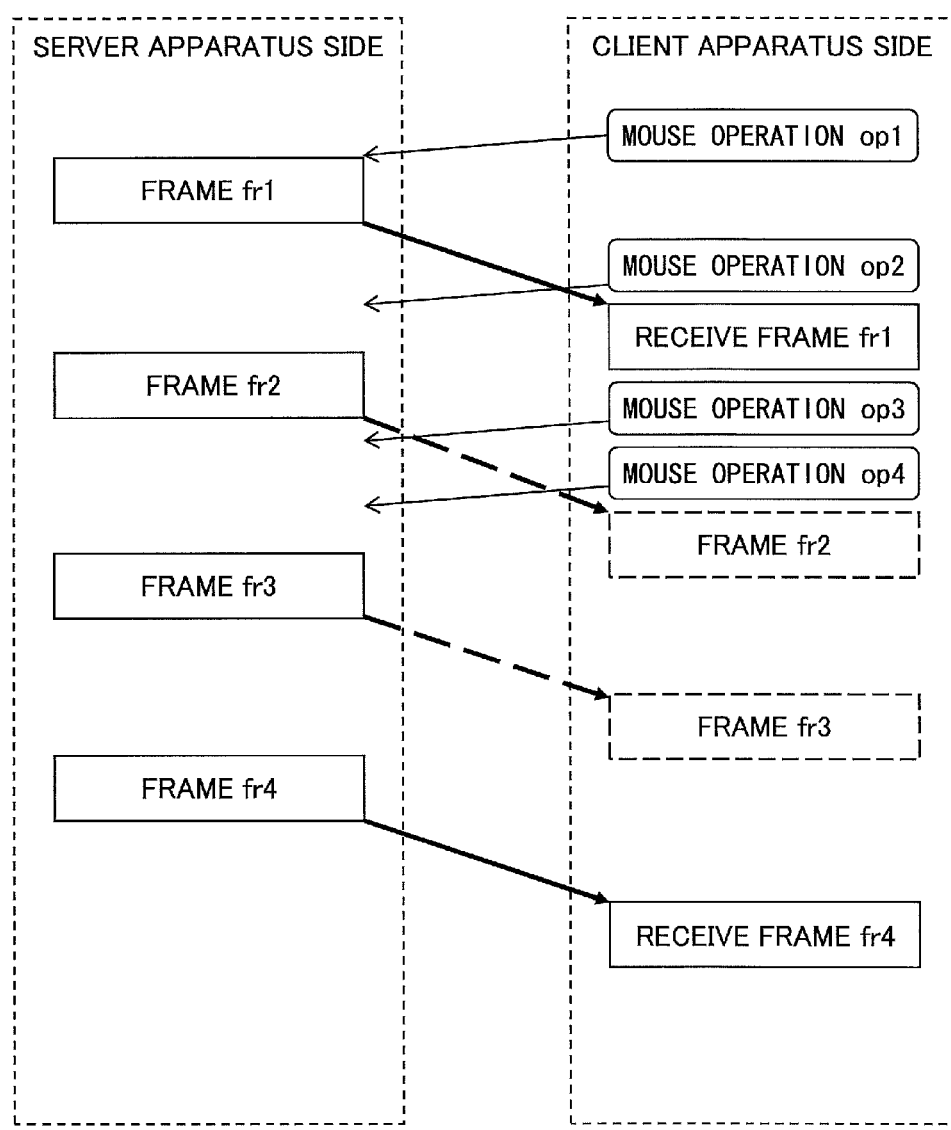
FIG. 3 is an illustration for explaining a transmission control of image data performed by the server apparatus.

FIG. 3 is an illustration for explaining a transmission control of image data performed by the server apparatus 1.

The server apparatus 1 performs a transmission control to sequentially transmit the image data (desktop screen) stored in the frame buffer to the client apparatus 2 according to a predetermined transmission interval M (for example, ⅓₀ second). It is assumed that the image data to be transmitted is frames fr1, fr2, fr3, fr4 . . . . The client apparatus 2 transmits the operation data indicating the occurred operation event to the server apparatus 1 each time an operation event occurs. It is assumed that the operation data to be transmitted is mouse operations op1, op2, op3, op4 . . . .

The server apparatus 1 is required to transmit the image data within a band according to which the client apparatus 2 is receivable, and performs a transmission control, as a known band control, based on an amount of transmission data of the image data (data size), a band of the network 3 and a data loss rate on the client apparatus 2 side.

The server apparatus 1 according to the present embodiment further perform a band control corresponding to an amount of operation events received from the client apparatus 2 in order to realize an efficient transmission of the image data.

If a number of operation events received by the server apparatus 1 for a fixed time is about 0 or 1, it is a condition where no user operation performed in the client apparatus 2 or a frequency of operation is not high. Accordingly, the user tends to feel that a display response is good because the screen is immediately updated in the client apparatus 2 due to the server apparatus 1 transmitting the image data (frame fr) at the transmission interval. Thus, if a number of operation events received during a fixed period is small, the server apparatus 1 transmits the frame fr at the transmission interval.

On the other hand, a number of operation events received during a fixed period is large, it is a condition where a user operation is frequently performed in the client apparatus 2. Accordingly, the screen updating in the client apparatus 2 is performed frequently, and if the screen updating is performed while the frame buffer displayed in the middle of an operation is skipped, it is difficult for a user to recognize the skipped screen.

Thus, the server apparatus performs a transmission control by reflecting a number of operation events received in a fixed time until a time when transmitting the frame fr in a determination value indicating whether to prevent the transmission of the frame fr.

For example, if mouse operations op3 and op4 are received from the client apparatus 2 within a fixed time until a time to transmit the frame fr3, the frame data indication the result of execution of the application is rewritten from the frame fr3 into the frame fr4. In such as case, if the frames fr3 and fr4 are transmitted to the client apparatus 2, the frame fr3 is immediately updated to the frame fr4. This is because, if the frame fr3 is skipped and the display is updated to the frame 4, a user hardly has an uncomfortable feel because the user is not possible to see the result of the operation.

Moreover, if the server apparatus 1 has received the mouse operation op2 within a fixed period before transmitting the frame fr1, a number of operation events received is small (1). However, if it is estimated that a transmission takes a long time due to an amount of data of the frame fr2 or the band of the network 3 according to a known band control, the server apparatus 1 controls to prevent the transmission of the frame fr2 even if a number of events is small.

As mentioned above, the server 1 surely transmits necessary image data in the band control to control the transmission so that an influence of a delay is not given to subsequent transmissions.

Figure 4:
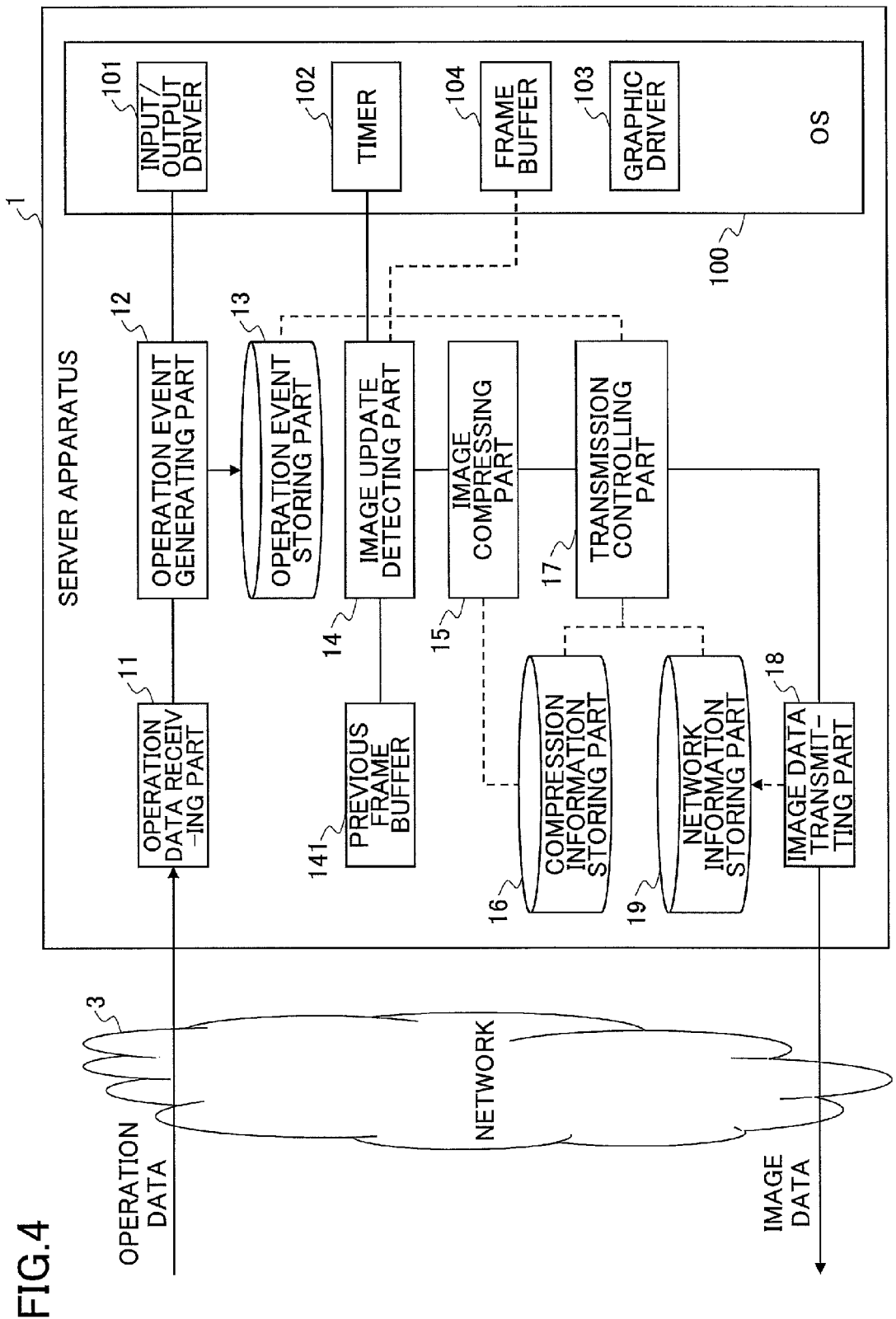
FIG. 4 is a diagram illustrating a block structure of an embodiment of the server apparatus.

FIG. 4 is a diagram of a block structure of an embodiment of the server apparatus 1.

The server apparatus 1 includes an operation data receiving part 11, an operation event generating part 12, an operation event storing part 13, an image update detecting part 14, a previous frame buffer 141, an image compressing part 15, a compression information storing part 16, a transmission controlling part 17, an image data transmitting part 18 and a network information storing part 19.

The operation data receiving part 12 receives operation data generated in the client apparatus 2.

The operation event generating part 12 generates an operation event based on the received operation data each time the operation data receiving part 11 receives the operation data, and notifies an input/output driver 101 managed by an OS (Operating System) 100 of the operation event and stores the operation event in the operation event storing part 13.

The image update detecting part 14 acquires the frame data (desktop screen image) from a frame buffer 104 managed by a graphic driver 103 by a timer signal of a timer managed by the OS 100, and extract an area of which data is updated (updated area) by comparing the previously acquired frame data retained in the previous frame buffer 141 with the frame data acquired this time. Further, for a next process, the image update detecting part 14 stores the frame data acquired at this time in the previous frame buffer 141.

The image compressing part 15 creates image data by image-compressing the updated area of the frame data extracted by the image update detecting part 14, and stores compression information containing an amount p (byte) of transmission data of the created image data in the compression information storage part 16.

The compression information storing part 16 stores compression information regarding the image compression of the image compressing part 15.

The transmission controlling part 17 performs a band control with respect to the transmitting process by the image data transmitting part 18 at the transmission interval M (seconds), and further performs a transmission control as to whether to suppress the image data based on an amount of operation events received from the client apparatus 2.

More specifically, the transmission controlling part 17 calculates a determination time t, as a transmission control, based on the compression information stored in the compression information storing part 16, network information stored in a network information storing part mentioned later, and a number of operation events stored in the operation event storing part 13. Then, the transmission controlling part 17 acquires the present time as a transmission time $t_{new}$ indicating the time of transmission at this time in the transmitting process for each transmission interval M, and compares the determination time t with the transmission time $t_{now}$. If the determination time t is later than (value exceeds) the transmission time $t_{new}$, the transmission controlling part 17 performs a control to prevent a transmission at this time. On the other hand, if the determination time t is earlier than (value is smaller) the transmission time the the transmission controlling part 17 performs a transmission at this time, and clears the operation event stored in the operation event storing part 13.

More specifically, the transmission controlling part 17 calculates the determination time t by the following formula using an amount p (byte) of transmission data contained in the compression information stored in the compression information storing part 16, a band X (bps: bit/seconds) and a loss rate q ($0 \leq p < 1$) of the image data received by the client apparatus 2 contained in the network information stored in the network information storing part 19, and an event number n of operation events stored in operation event storing part 13.

$$t = t_0 + f(n) * \min(p(1+q)/(X/8), M)$$

A previous transmission time $t_0$ in the above-mentioned formula is a time (the present time t at that time) when the transmission controlling part 17 acquired as a transmission time in the immediately previous control. f(n) is a monotone increasing function f(n) based on the event number n, and takes a value of $1 \leq f(n) < 3n$.

According to the above-mentioned formula, because if no operation event is stored in the operation event storing part 13 (event number n=0), the monotone increasing function f(n)=1, the event number of operation events is not reflected in the transmission control of the image data. However, if operation events are stored in the operation event storing part 13 (event number n>1), the event number n causes the determination time t to increase, and, therefore, the operation event number is reflected in the transmission control of the image data.

The image data transmitting part 18 transmits the image data to the client apparatus 2 according to the RPS transmission via the network 3 based on the control of the transmission controlling part 17. Further, the image data transmitting part 18 acquires a reception response from the client apparatus 2, and saves in the network information storing part 19 a transmission time and a reception time contained in the reception response and network information (a band X, a loss rate q) obtained based on an amount of data of the received image data.

As mentioned above, the server apparatus 1 is capable of materializing the transmission control of image data in which the operation event number received from the client apparatus 2 during a fixed period by a simple calculation process by the transmission controlling part 17 being configured to perform the calculation of the determination time t according to the formula containing a monotone increasing function f(n) of the event number n.

Figure 5:
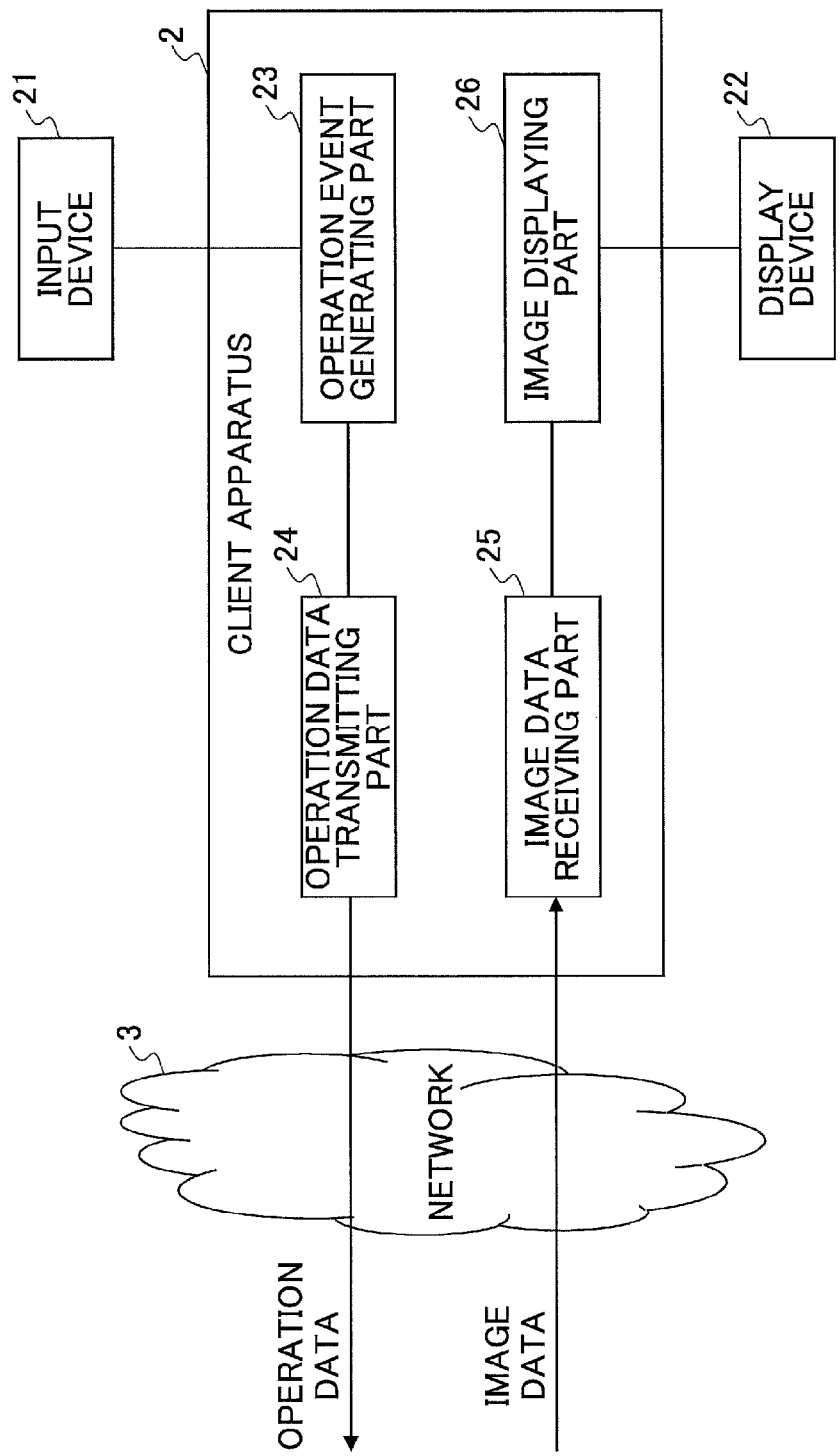
FIG. 5 is a diagram illustrating a block structure of an embodiment of the client apparatus.

FIG. 5 is a diagram illustrating a block structure of an embodiment of the client apparatus 2.

The client apparatus 2 includes, besides the input device 21 and the display device 22, an operation event generating part 23, an operation data transmitting part 24, an image data receiving part 25 and an image displaying part 26.

The operation event generating part 23 generates an operation event based on a user operation on the input device 21.

The operation data transmitting part 24 transmits operation data indicating the generated operation event to the server apparatus 1 via the network 3.

The image data receiving part 25 receives a transmission packet of the image data transmitted by the server apparatus 1 according to the RPS transmission, and restores complete image data based on the received transmission packet.

The image display part 26 reproduces image frame data based on the image data, and displays it on the display device 22.

Next, a description is given of a flow of a process in the server apparatus 1 and the client apparatus 2.

The server apparatus 1 performs the following process of operation data processing.

Figure 6:
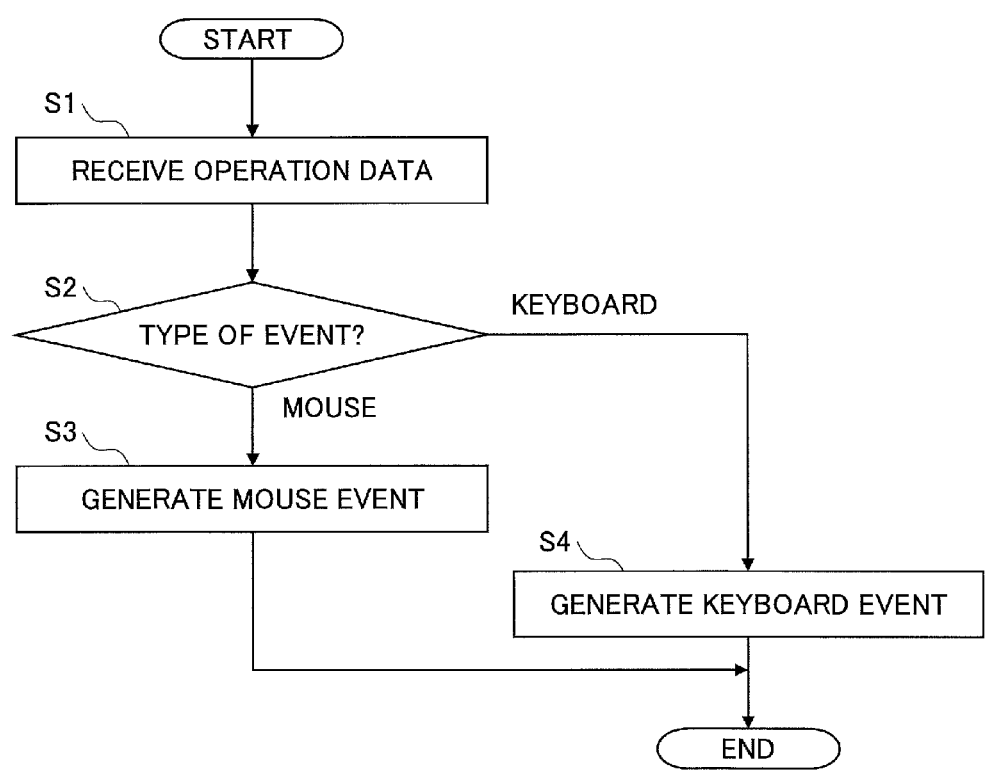
FIG. 6 is a chart illustrating a process flow of an operation data process in the server apparatus.

FIG. 6 is a chart illustrating a process flow of the operation data processing performed in the server apparatus 1.

The operation data receiving part 11 receives operation data from the client apparatus 2 (step S1). The operation event generating part 12 determines a type of operation event based on the received operation data (step S2). If the type of the event is a mouse event ("mouse" of step S2), the operation event generating part 12 generates a mouse event, and notifies the input/output driver 101 of the generated mouse event, and further stores the mouse event in the operation event storing part 13 (step S3). If the type of the event is a keyboard event ("keyboard" of step S2), the operation event generating part 12 generates a keyboard event, and notifies the input/output driver 101 of the generated keyboard event, and further stores the keyboard event in the operation event storing part 13 (step S4).

According to the operation data processing, the operation events generated in the client apparatus 2 are sequentially accumulated in the operation event storing part 13.

The server apparatus 1 performs the following process as image data processing.

Figure 7:
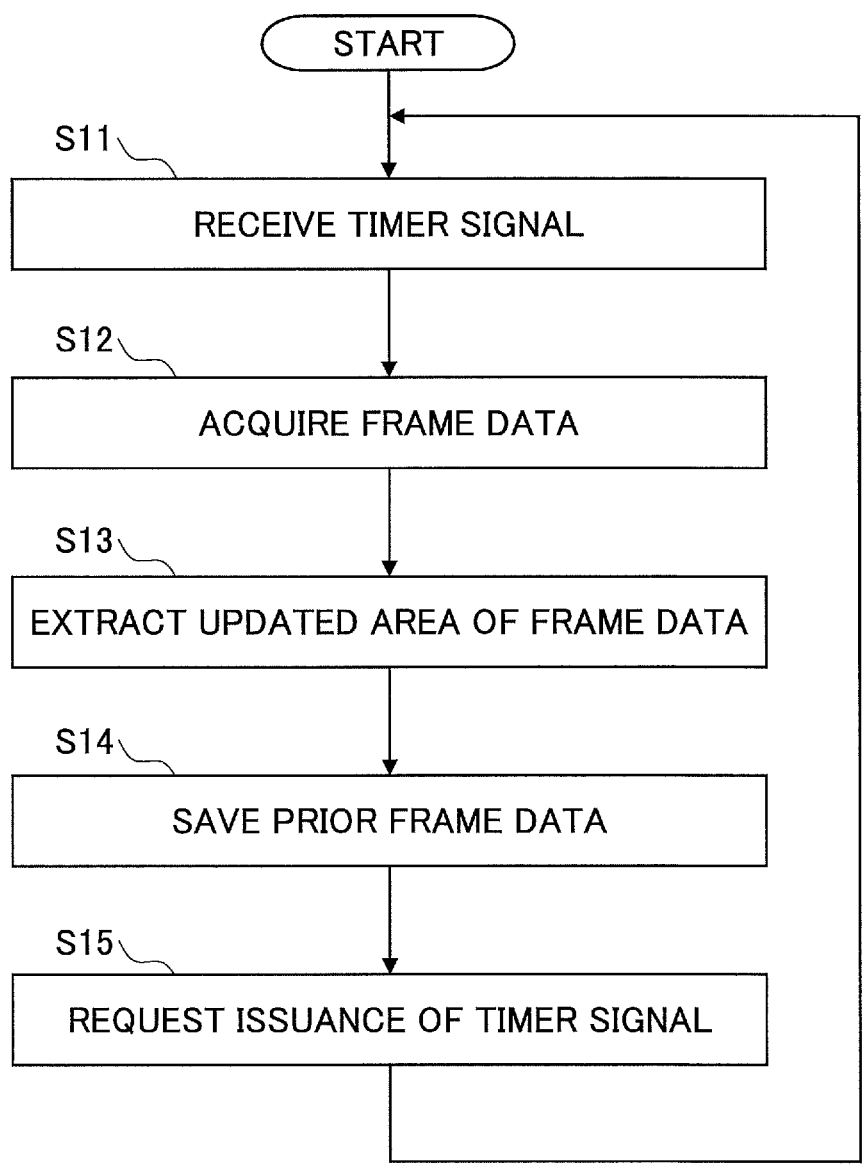
FIG. 7 is a chart illustrating a process flow of an image data acquiring process of the server apparatus.

FIG. 7 is a chart illustrating a process flow of an image data acquiring process performed by the server apparatus 1.

In the server apparatus 1, the process of steps S11 to S15 of FIG. 7 is repeatedly performed, and data, which is image data to be transmitted to the client apparatus 2, is acquired.

When the image update detecting part 14 receives a timer signal from the timer 102 (step S11), the image update detecting part 14 acquires frame data (desktop screen) stored in the frame buffer 104 (step S12). Then, the image update detecting part 14 compares the previous frame data obtained by the immediately previous acquiring process stored in the previous frame buffer 141 with frame data acquired by the processing at this time, and extracts an area having different data as an updated area (step S13). Further, the image update detecting part 14 stores the frame data acquired by the processing at this time as previous frame data in the frame buffer 141 (step S14), and requests the timer 102 for a next timer signal (step S15).

Figure 8:
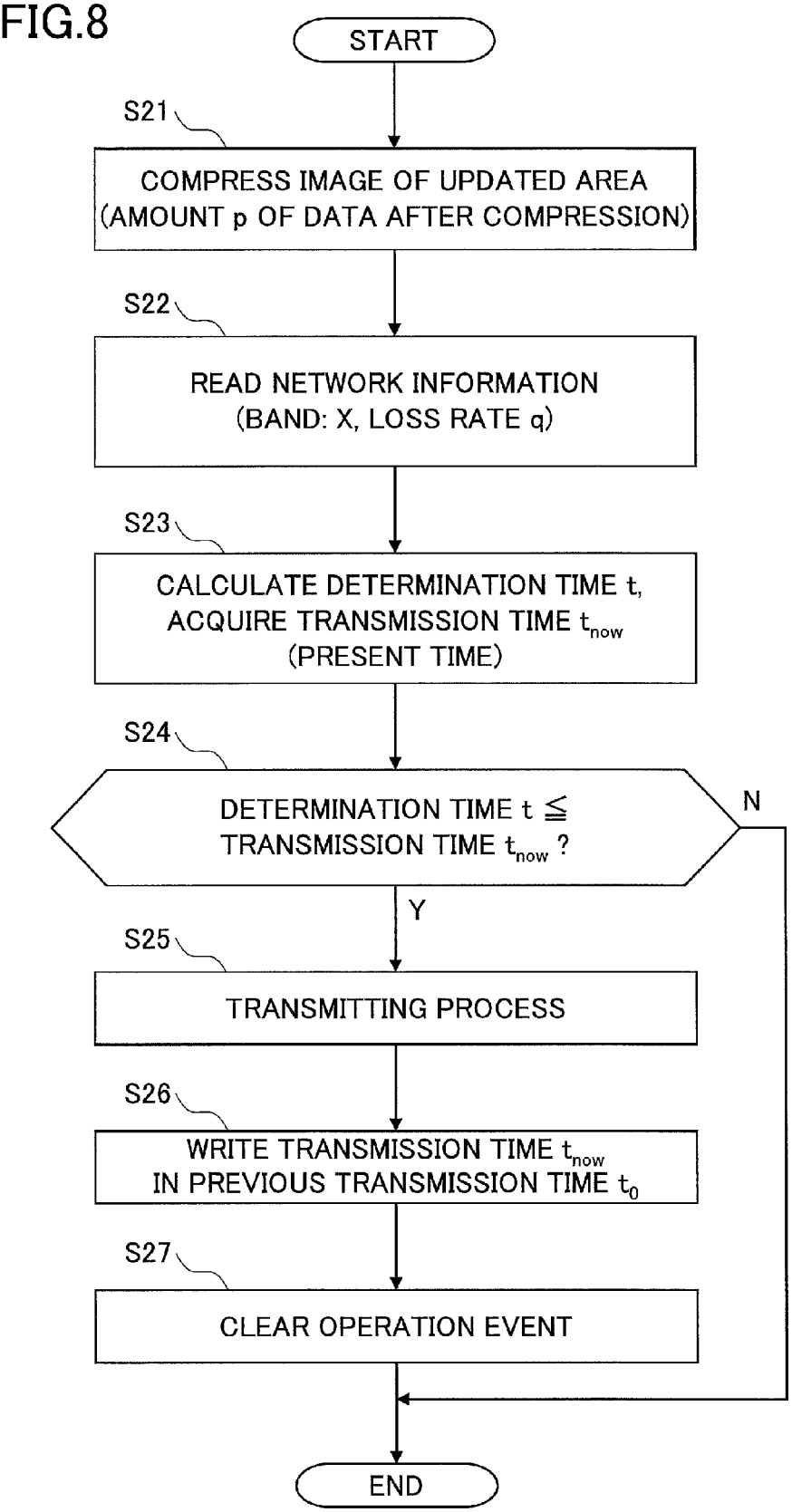
FIG. 8 is a chart illustrating a process flow of an image data transmitting process of the server apparatus.

FIG. 8 is a chart illustrating a process flow of an image data transmitting process of the server apparatus 1.

In the server apparatus 1, the process of steps S21 to S27 is performed each time the predetermined transmission interval M is passed so that image data is transmitted.

The image compressing part 15 performs a compressing process on the data of the updated area of the frame data extracted by the image update detecting part 14 to create image data to be a transmitting target, and saves, as compression information, an amount p (byte) of data after the compressing process in the compression information storing part 16 (step S21). The transmission controlling part 17 acquires a band X and a loss rate q ($0 \leq q < 1$) of the network information from the network information storing part 19 (step S22).

Further, the transmission controlling part 17 acquires the present time as the transmission time $t_{now}$ at this time, and calculates the determination time t by using the formula "$t=t_0+f(n)*\min(p(1+q)/(X/8),M)$" (step S23). If the determination time t is earlier than the transmission time $t_{now}$ ($t \leq t_{now}$), the transmission controlling part 17 determines that a transmission should be performed (Y of step S24). The image data transmitting part 18 receives the transmission execution of the transmission controlling part 17, and transmits the image data to the client apparatus 2 (step S25). Thereafter, the transmission controlling part 17 writes the transmission time $t_{now}$ in the previous transmission time $T_0$ (step S26), and the process is ended after clearing the operation events stored in the operation event storing part 13 (step S27).

On the other hand, if the determination time t is not a time earlier than the transmission time $t_{now}$ ($t \leq t_{now}$), the transmission controlling part 17 determines that a transmission should be prevented (N of step S24), and the process is ended. In this case, a transmission of the image data is not performed because the image data transmitting part 18 does not receive the transmission execution of the transmission controlling part 17.

Next, a description is given of a process of the client apparatus 2.

In the client apparatus 2, the operation event generating part 23 detects a movement, an input, a selection, etc., of the pointing position, and causes an operation event indicating the detected operation to occur. Then, the operation data transmitting part 24 TCP-transmits the type of the generated operation event and operation data indicating the operation contents to the server apparatus 1 via the network 3 at each time an operation event occurs.

Moreover, the image data receiving part 25 receives the image data from the server apparatus 1, and decodes it to frame data. The image display part 26 displays the decoded frame data on the display device 22.

It should be noted that the process of the client apparatus 2 is implemented by a known process, and a detailed description of the process is omitted.

Although the server apparatus 1 performs a transmission of image data to the client apparatus 2 according to the RPS communication in the process according to the present embodiment mentioned above, the communication method is not limited to the RPS communication. The image data transmitting part 18 of the server apparatus 1 may be configured to perform a TCP (Transmission Control Protocol) communication or a UDP communication instead of the RPS communication.

Although the TCP communication and the UDP communication are known processes and a detailed description is omitted, if the image data transmitting part 18 transmits image data according to the TCP communication, it is assumed that the loss rate q is set to "0" and the band X is set to an arbitrary fixed value beforehand in the formula to calculate the determination time t. Additionally, if the image data transmitting part 18 transmits image data according to the UDP communication, it is assumed that the loss rate q is set to "0" or an arbitrary fixed value and the band X is set to an arbitrary fixed value beforehand in the formula to calculate the determination time t. Also in the case of these examples, the band X and the loss rate q are stored in the network information storing part 19.

Figure 9:
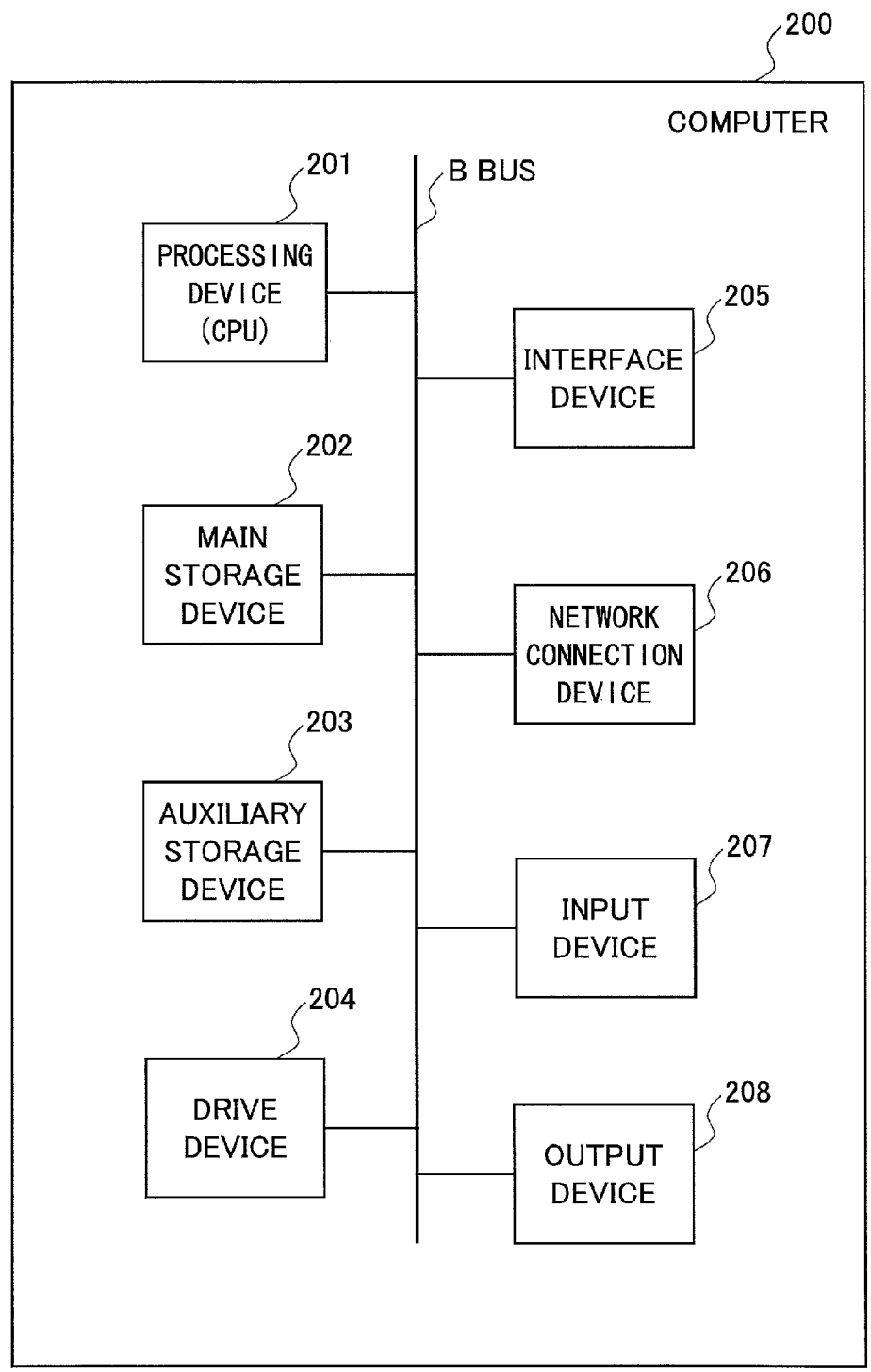
FIG. 9 is a diagram illustrating a hardware structure of the server apparatus and the client apparatus.
Figure 10:
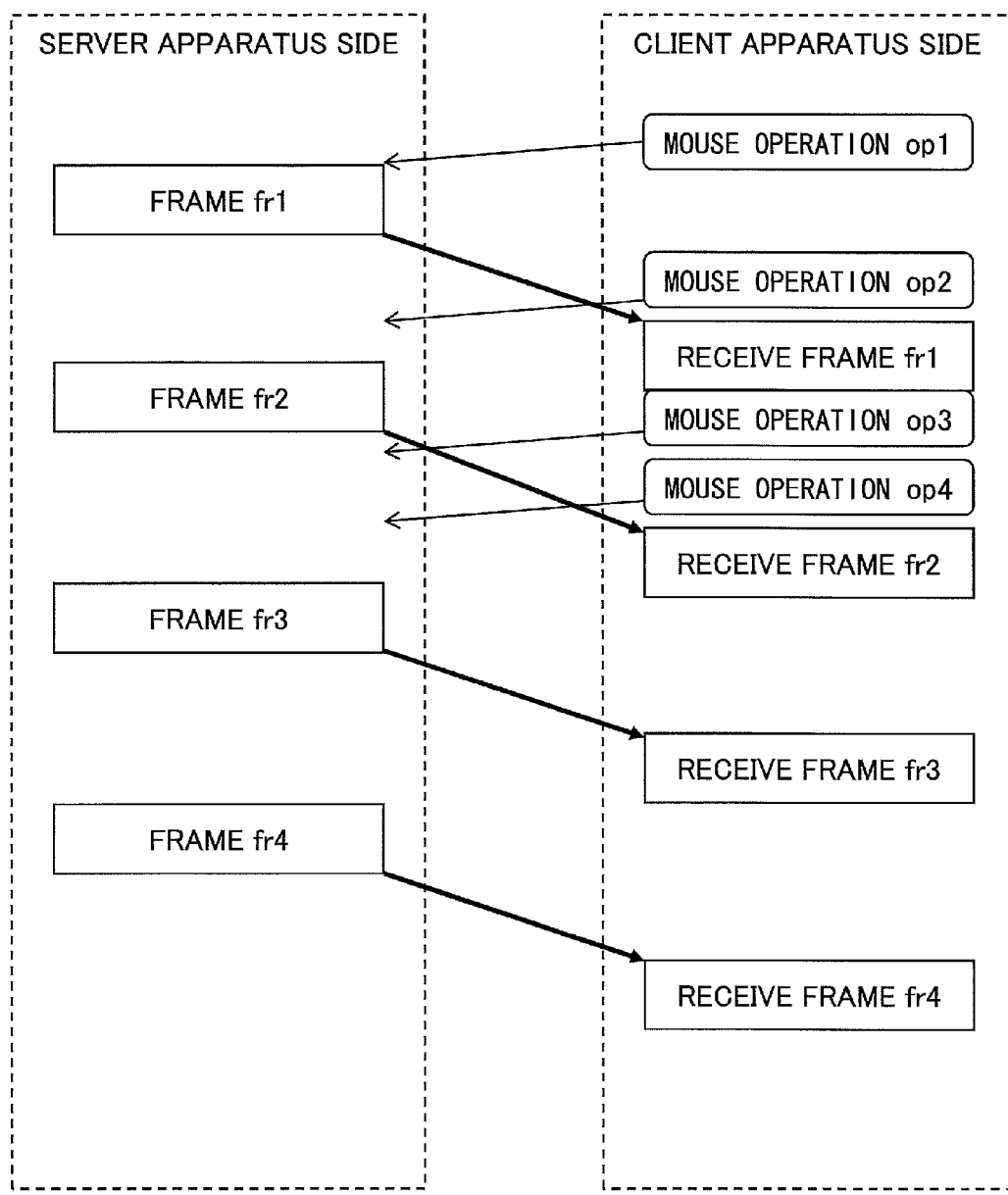
FIG. 10 is an illustration for explaining a delay in a case of a method of transmitting at a fixed frame rate.
Figure 11:
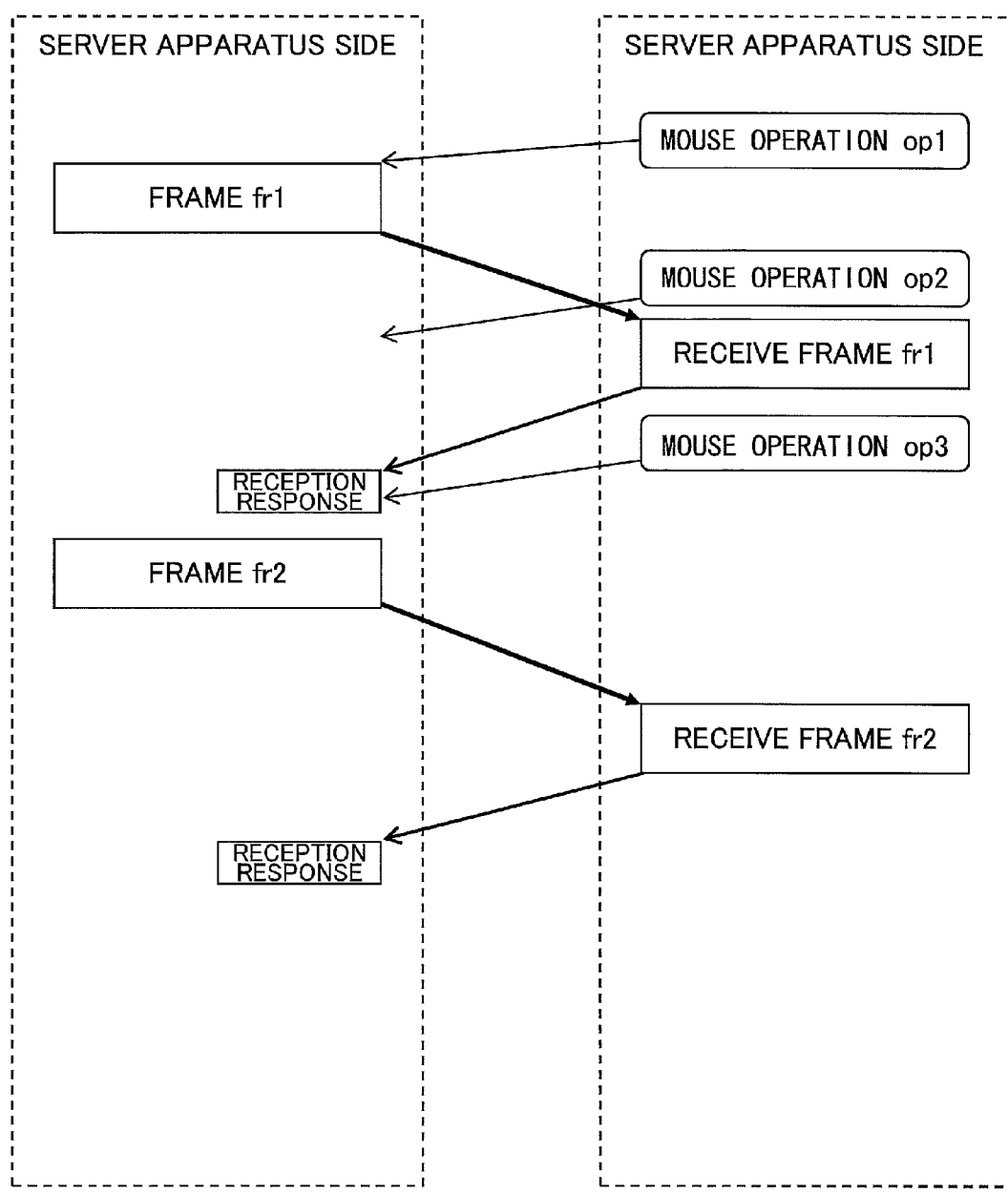
FIG. 11 is an illustration for explaining a delay in a case of a method of transmitting after waiting a response from a receiving apparatus.

The server apparatus 1 and the client apparatus 2 according to the present embodiment can be implemented as computers. FIG. 9 is a diagram illustrating hardware structures of the serer apparatus 1 and the client apparatus 2.

A computer 200 includes, for example, a processor (CPU: Central Processing Unit) 201, a main storage device 202, an auxiliary storage device 203, a drive device 204, an interface device 205, a network connection device 206, an input device 207, an output device 208, etc., and these devices are connected to a bus B.

The processor 201 controls the entire computer 200, and materializes the function with respect to the server 1 according to a program stored in the main storage device 202. The main storage device 202 reads a program of an OS to be executed by the CPU 201, an application program, data, etc., from the auxiliary storage device 203, and stores them therein. The auxiliary storage apparatus 203 stores programs and also data necessary for processing therein.

By a recording medium on which a program is recorded being set in the drive device 204, the program is installed in the auxiliary storage device 203 via the drive device 204. The recording medium may be, for example, an FD (flexible disk), a CD-ROM, a DVD, an magneto-optical disk, etc. It should be noted that an installation of a program is not necessarily performed using a recording medium, and a program can be downloaded by other computers through a network.

The interface device 205 is a device for connecting to a network, and performs transmission and reception of programs and data with other computers. The input device 207 is a device for inputting an operation instruction, and is, for example, a keyboard, a mouse, a touch panel, etc. The output device 208 is a device for displaying GUI (Graphical User Interface) according to a program or the like, and is, for example, a display, etc.

The server apparatus 1 and the client apparatus 2 are not only be implemented as a hardware but also be implemented as computer software.

For example, the server apparatus 1 can be materialized by creating a program to cause a computer to execute functions of the operation data receiving part 11, the operation event generating part 12, the image update detecting part 14, the image compressing part 15, the transmission controlling part 17 and the image data transmitting part 18 illustrated in FIG. 4, and causing the main storage device 202 of the computer 200 to read and execute the program. Moreover, the client apparatus 2 can be materialized by creating a program to cause a computer to execute functions of the operation event generating part 23, the operation data transmitting part 24, the image data receiving part 25 and the image displaying part 26 illustrated in FIG. 5, and causing the main storage device 202 of the computer 200 to read and execute the program.

The program to materialize the server apparatus 1 may be stored not only in a recording medium such as a CD-ROM, a CD-RW, a DVD-R, a DVD-RAM, a DVD-RW, etc., or a recording medium such as a flexible disk, etc., but also in other storage devices provided at an end of a communication line or a storage device such as a hard disk of a computer.

Moreover, the structural elements forming the server apparatus 1 and the client apparatus 2 may be materialized by an arbitrary combination. A plurality of structural elements may be materialized as a single member, and a single structural element may be configured by a plurality of members.

Further, the server apparatus 1 and the client apparatus 2 are not limited to the above-mentioned embodiments, and, of course, various modifications and changes may be made without departing from the scope of the present invention.

As mentioned above, according to the present invention, the image transmitting side can materialize an efficient transmission in consideration of not only a state of network transmitting image data and an amount of data but also an operation event generated in the image receiving side.

Accordingly, an environment in which a user hardly has an uncomfortable feel in a remote operation can be provided because, for example, an update of a desktop screen is performed smoothly in the client apparatus of the image receiving side.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. An image transmitting method of transmitting image data from an image transmitting apparatus to an image receiving apparatus, comprising:
   receiving, by the image transmitting apparatus, operation events generated in the image receiving apparatus through a network;
   calculating, by the image transmitting apparatus, a determination time of the image data, in a transmission control which is performed at a predetermined transmission interval, based on an amount of the image data to be transmitted to the image receiving apparatus, information regarding the network through which the image data is transmitted, and a number of the operation events that have been received from an immediately previous transmission time to a current transmission time indicating a time scheduled to transmit the image data;
   comparing, by the image transmitting apparatus, the determination time with the current transmission time; and
   skipping, by the image transmitting apparatus, transmission of the image data when the determination time is later than the current transmission time.

2. The image transmitting method as claimed in claim 1, wherein the calculating includes acquiring a band of the network and a loss rate of the image data contained in response information received from the image receiving apparatus immediately after the previous transmission time, and using the band and the loss rate as the information regarding the network in calculating the determination time.

3. A non-transitory computer readable recording medium storing a program causing a computer to perform a process of transmitting image data to an image receiving apparatus, the process including:
   receiving operation events generated in the image receiving apparatus through a network;
   calculating a determination time of the image data, in a transmission control which is performed at a predetermined transmission interval, based on an amount of transmission data of the image data to be transmitted to the image receiving apparatus, information regarding the network through which the image data is transmitted, and a number of the operation events that have been received from an immediately previous transmission time to a current transmission time indicating a time scheduled to transmit the image data;
   comparing the determination time with the current transmission time; and
   skipping transmission of the image data when the determination time is later than the current transmission time.

4. An image transmitting apparatus for transmitting image data to an image receiving apparatus, the image transmitting apparatus comprising:
   a storage device storing a program; and
   a processor coupled to the storage device and configured to perform a process including
   acquiring the image data;
   transmitting the image data to the image receiving apparatus at a predetermined transmission interval;
   receiving operation events generated in the image receiving apparatus through a network;
   storing in the storage device the received operation events;
   calculating a determination time of the image data, in a transmission control which is performed at the predetermined transmission interval, based on an amount of the image data to be transmitted to the image receiving apparatus, information regarding the network through which the image data is transmitted, and a number of the operation events that have been received from an immediately previous transmission time to a current transmission time indicating a time scheduled to transmit the image data,
   comparing the determination time with the current transmission time, and
   skipping transmission of the image data when the determination time is later than the current transmission time.

* * * * *